United States Patent [19]

Gaudette et al.

[11] 4,344,272
[45] Aug. 17, 1982

[54] COMBINED COTTON MODULE BUILDER AND SEED COTTON TRASH EXTRACTOR

[75] Inventors: Andrew J. Gaudette; Dave A. Dana, both of Livermore; Donald Haney, San Jose, all of Calif.

[73] Assignee: Cotton Machinery Company, Inc., Livermore, Calif.

[21] Appl. No.: 184,078

[22] Filed: Sep. 4, 1980

[51] Int. Cl.³ .................................... A01D 61/00
[52] U.S. Cl. ........................... 56/16.6; 56/28; 100/221; 19/200
[58] Field of Search .............. 56/28, 16.4, 16.5, 16.6; 209/616; 19/200, 202, 203, 204, 205; 100/226, 227, 228, 221

[56] References Cited

U.S. PATENT DOCUMENTS

| | | | |
|---|---|---|---|
| 1,814,761 | 7/1931 | Mitchell . | |
| 1,878,662 | 9/1932 | Benjamin . | |
| 2,763,117 | 9/1956 | Wagnon | 56/30 |
| 3,010,159 | 11/1961 | Roberson et al. | 19/67 |
| 3,100,368 | 8/1963 | Logan | 56/12 |
| 3,302,249 | 2/1967 | Cox | 19/200 |
| 3,309,851 | 3/1967 | Logan | 56/12 |
| 3,352,092 | 11/1967 | Hubbard | 56/12 |
| 3,412,532 | 11/1968 | Nickla | 56/12 |
| 3,422,751 | 1/1969 | Hubbard | 100/233 |
| 3,528,138 | 9/1970 | Elder | 19/203 |
| 3,530,652 | 9/1970 | Long et al. | 56/12 |
| 3,749,003 | 7/1973 | Wilkes et al. | 100/226 |

FOREIGN PATENT DOCUMENTS 192533  3/1967  U.S.S.R. .................... 56/28

Primary Examiner—Robert A. Hafer
Attorney, Agent, or Firm—Jack M. Wiseman; Francis W. Anderson

[57] ABSTRACT

A cotton module builder comprising an open-top frame. At the rear end of the frame is a rear door mounted for pivotal movement. When seed cotton has been compressed into a module, it is removed from the open-top frame, while the rear door is opened. While the seed cotton is being compressed by the cotton module builder, the rear door is closed. Secured to the rear end of the frame is a cradle that supports extractor apparatus for removing foreign matter from seed cotton before the seed cotton is deposited into the open-top frame for compression. Pivotally supported by the cradle is a basket and lifting conveyor. Means are provided for raising and lowering the basket and lifting conveyor. Before the rear door of the module builder is opened for the removal of a cotton module from the open-top frame, the basket and the lifting conveyor are raised out of the path of movement of the rear door and the compressed cotton module advancing therethrough. After the rear door is closed for the compacting of seed cotton free of foreign matter into a cotton module in the open-top frame, the basket and the lifting conveyor are moved into a lowered position. Seed cotton is deposited into the basket while in the lowered position and the lifting conveyor advances the seed cotton to the extractor apparatus for removing foreign matter from the seed cotton. The seed cotton free of foreign matter is deposited by the extractor apparatus into the open-top frame structure to be compressed into a cotton module.

27 Claims, 19 Drawing Figures

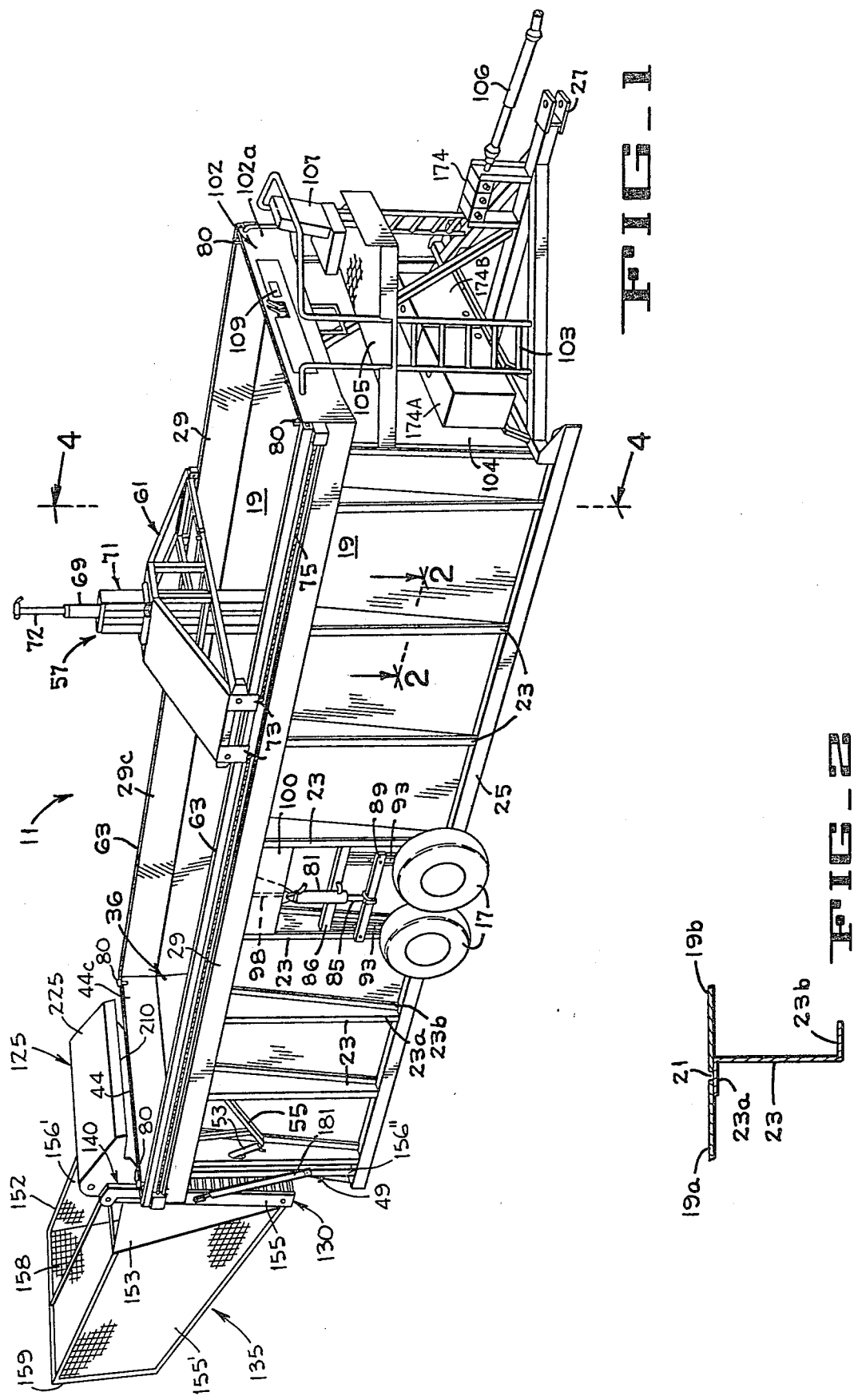

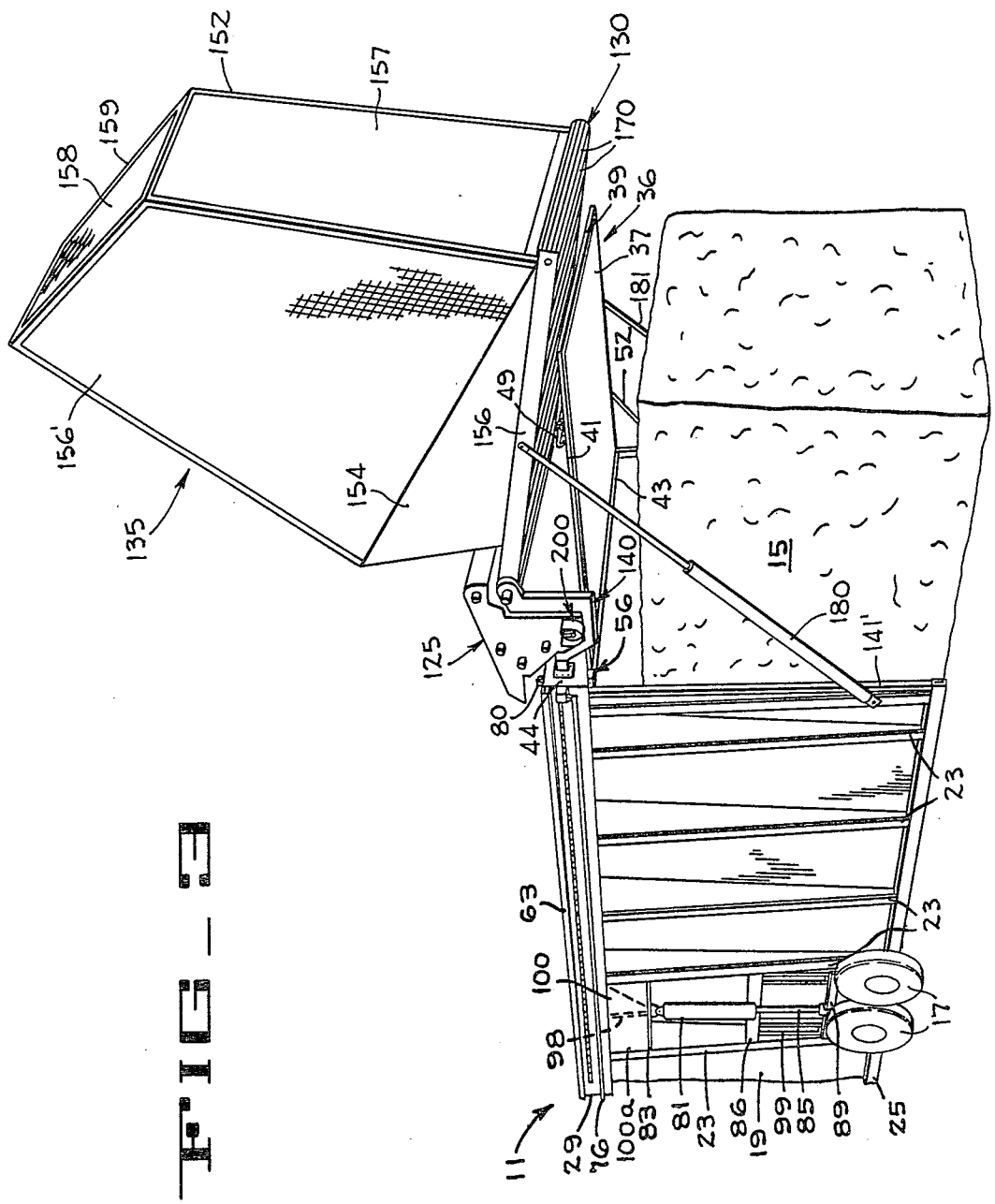

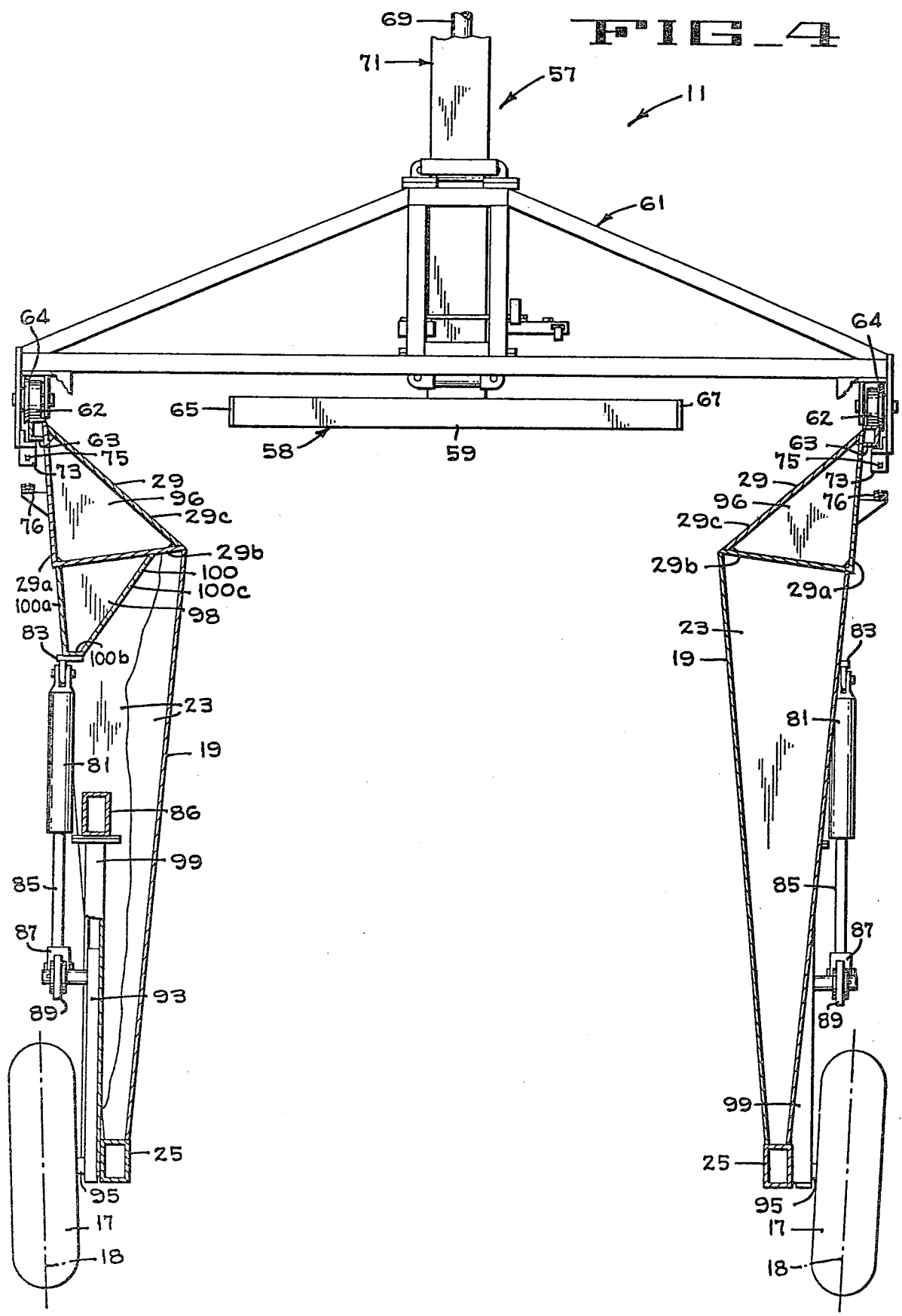

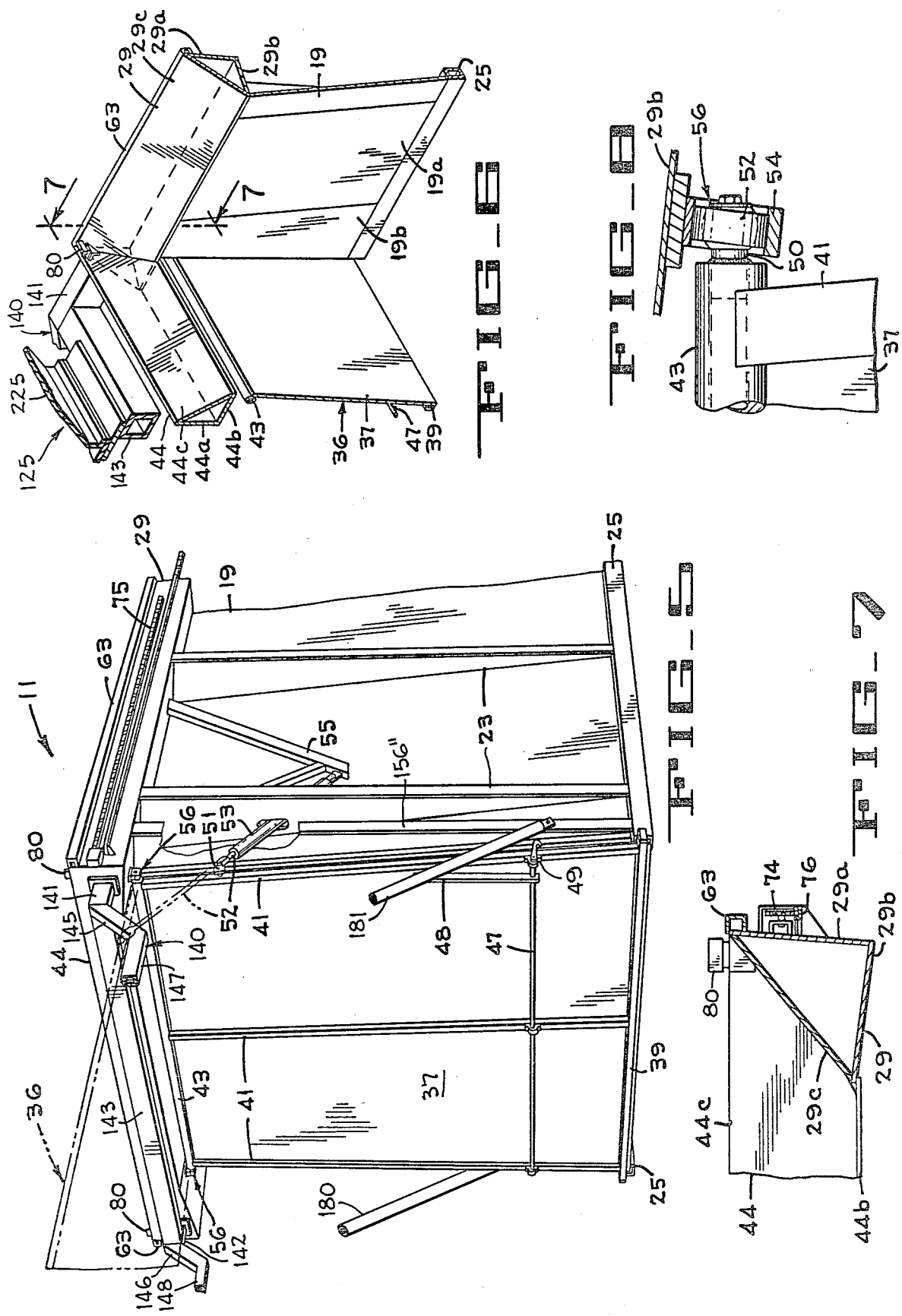

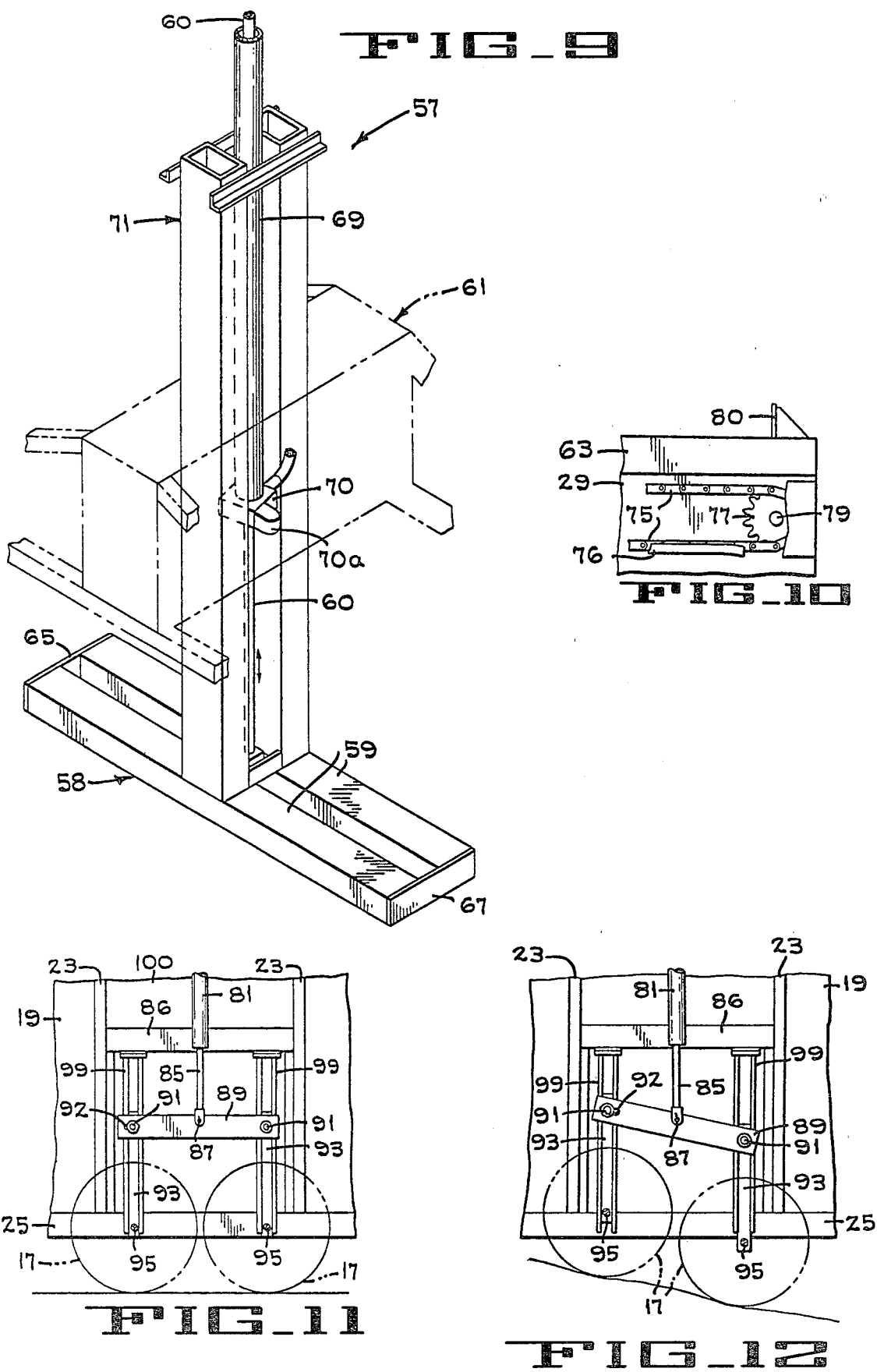

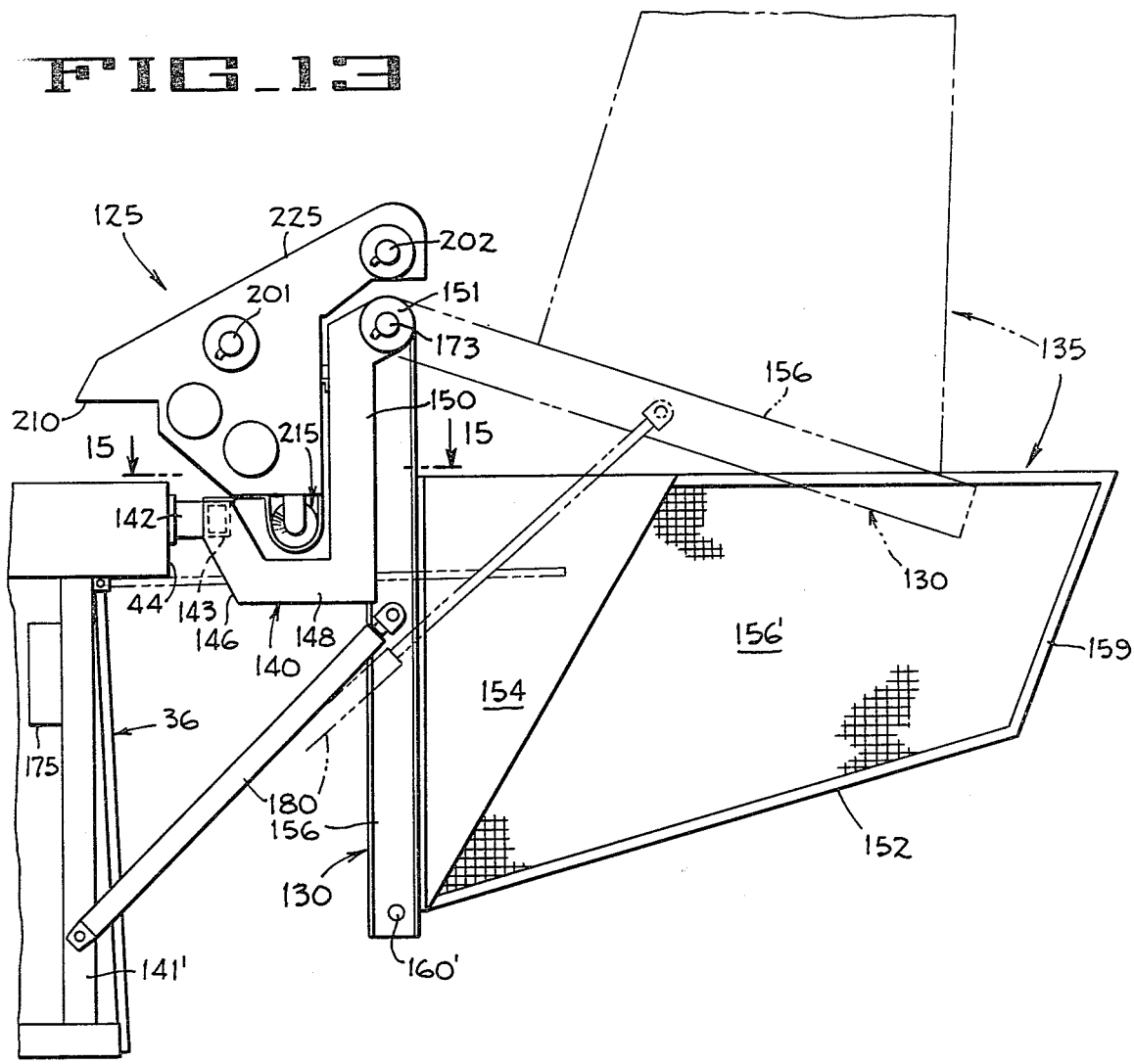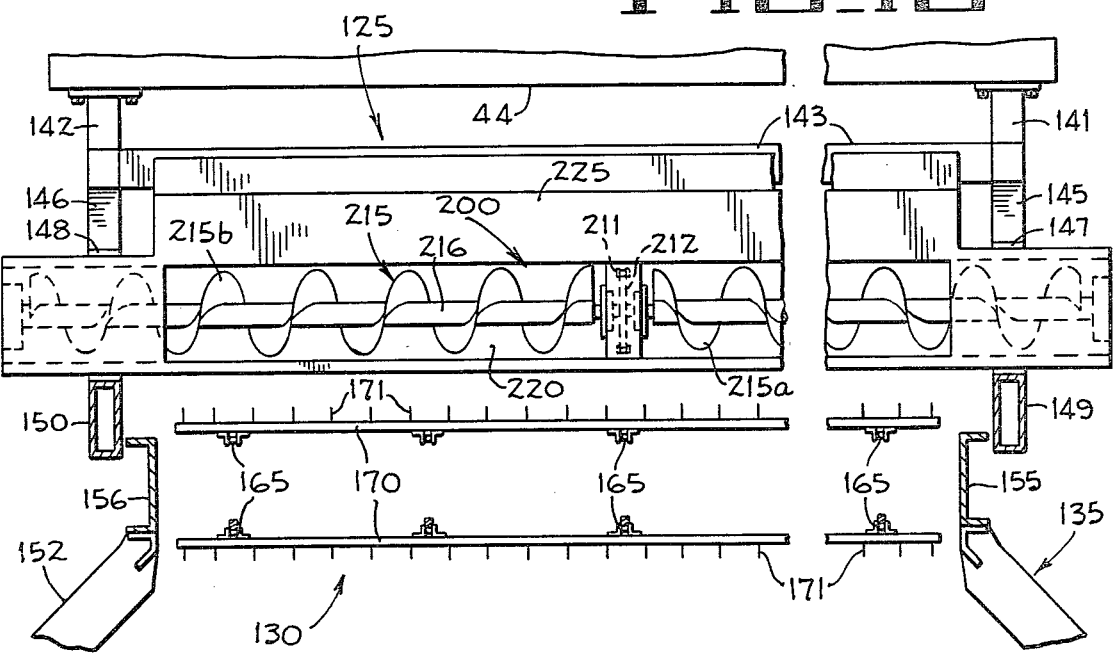

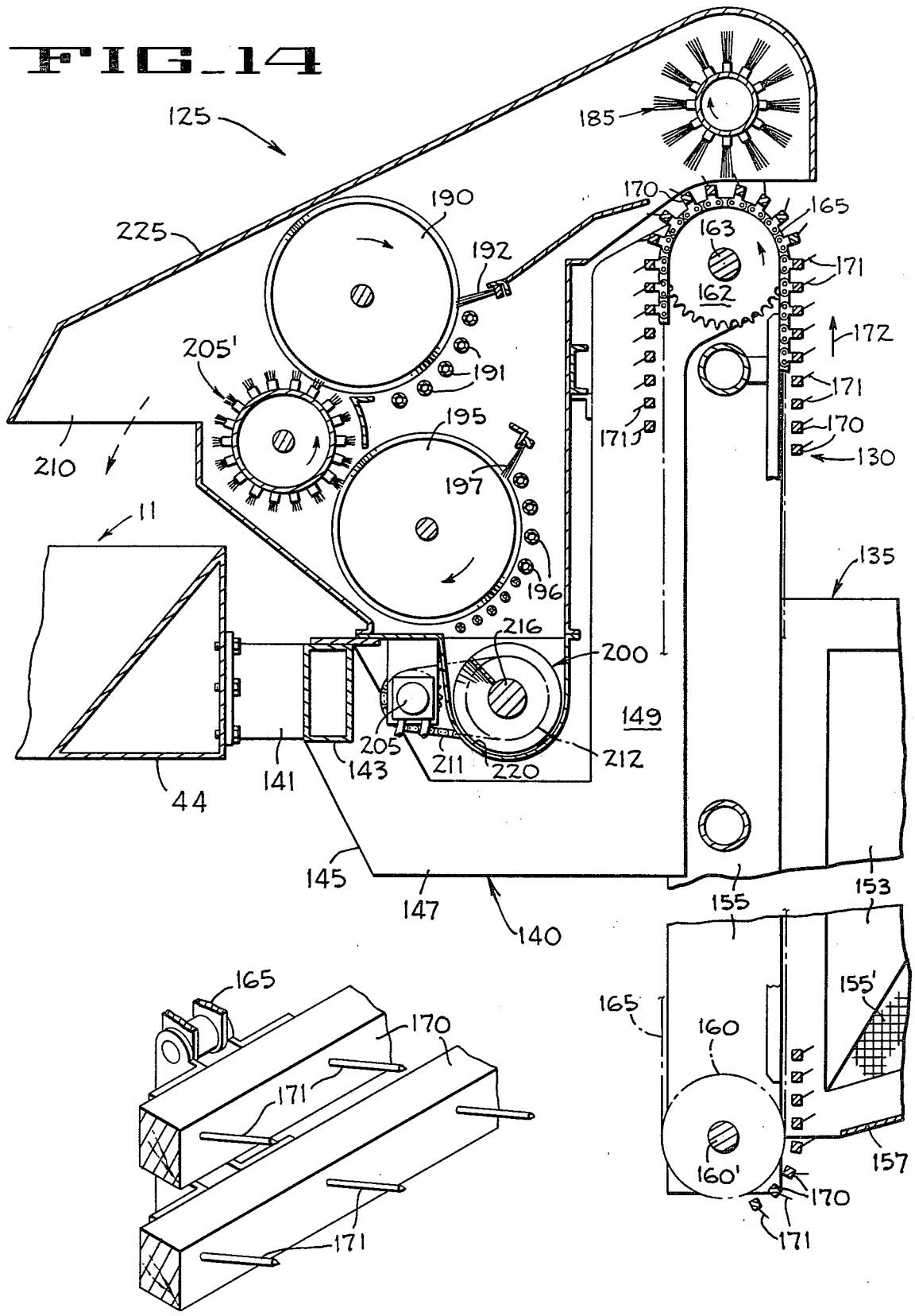
FIG_14
FIG_16

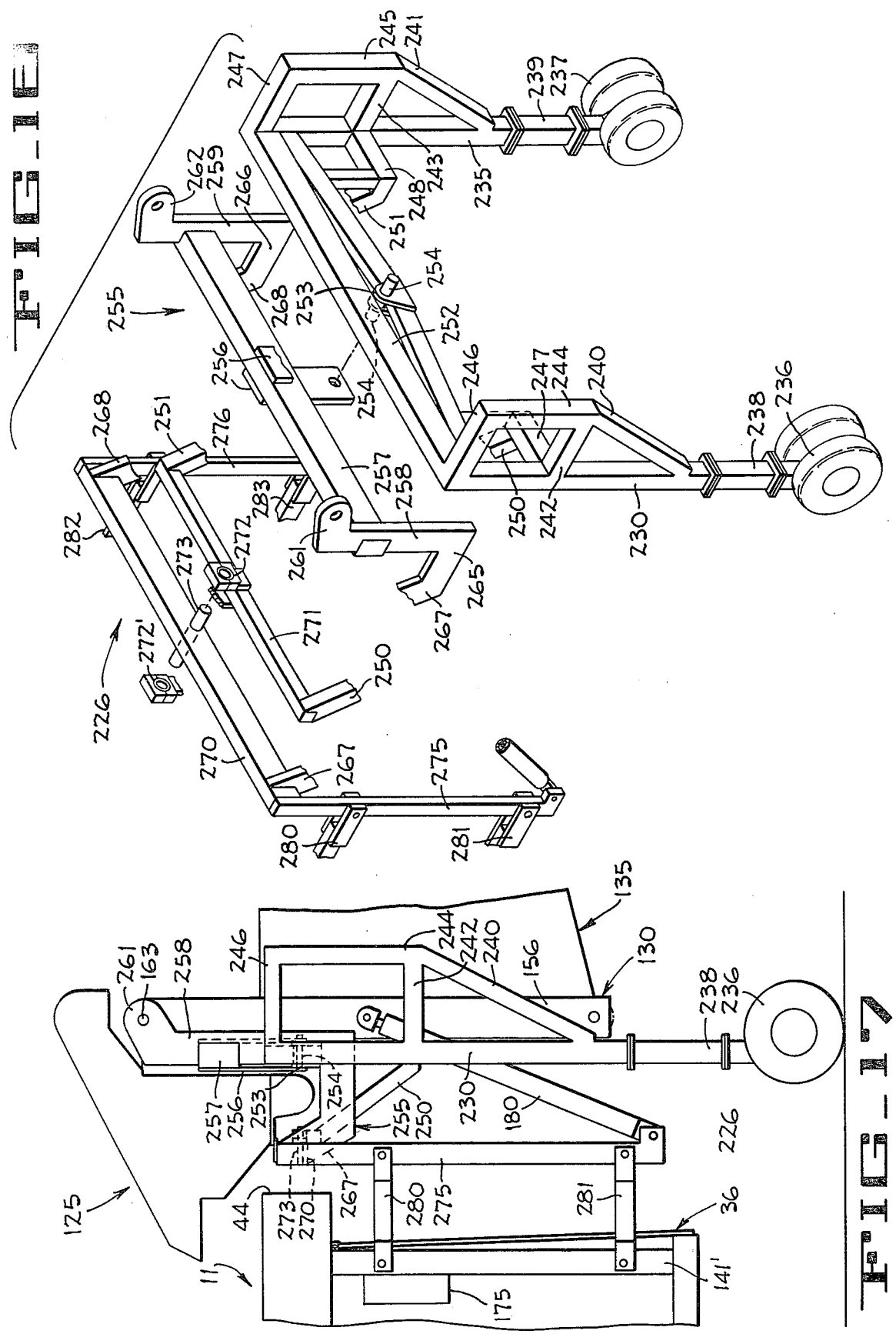

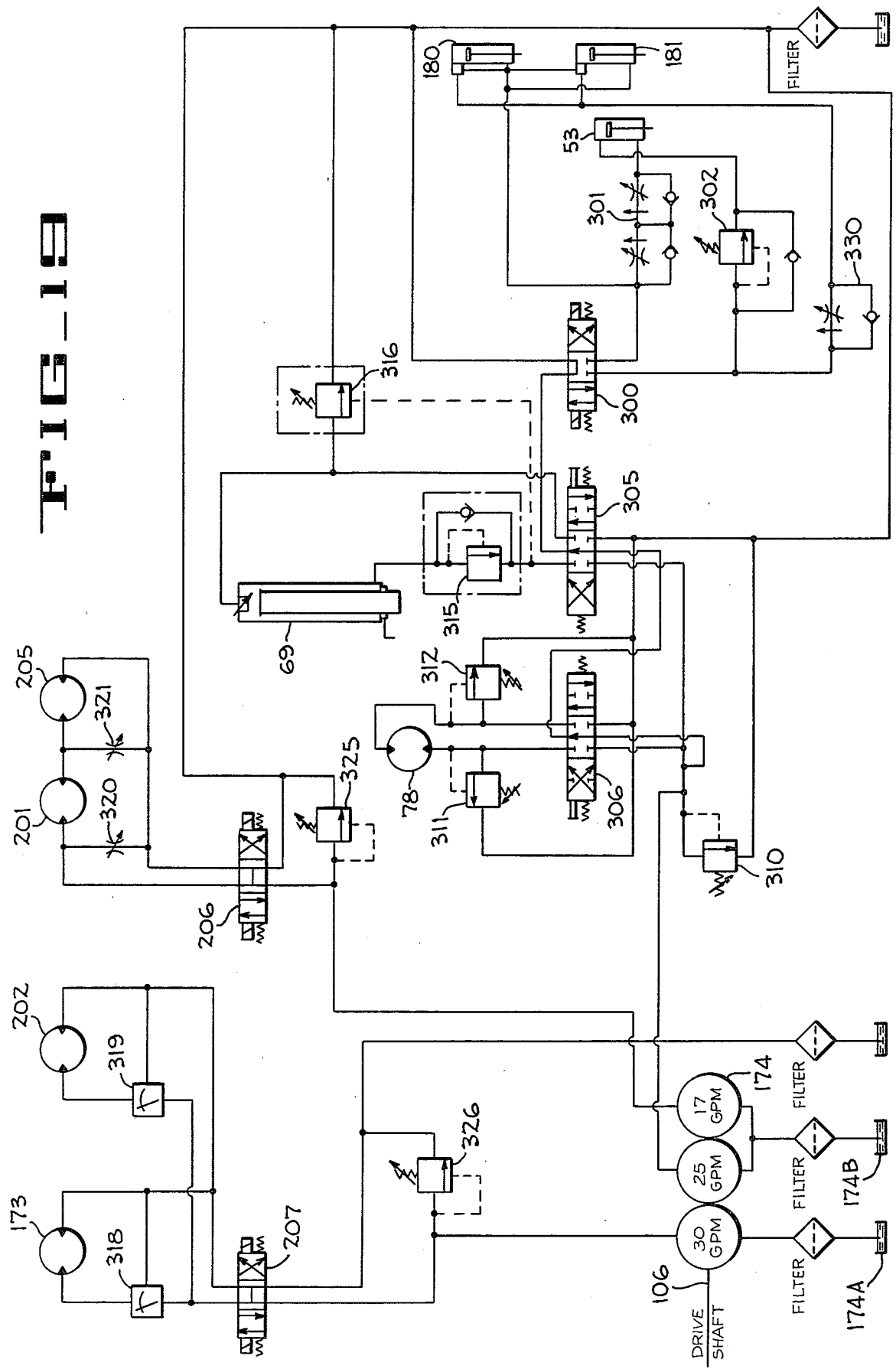
FIG_19

COMBINED COTTON MODULE BUILDER AND SEED COTTON TRASH EXTRACTOR

BACKGROUND OF THE INVENTION

The present invention relates in general to cotton module builders, and more particularly to a cotton module builder with extractor apparatus for removing foreign matter from the seed cotton before the seed cotton is formed into a cotton module.

Cotton module builders of the type herein disclosed are well-known in the art and are fully disclosed in the patent to Orlando et al., U.S. Pat. No. 3,941,047, issued on Mar. 2, 1976, for Cotton Module Builder. Apparatus for cleaning and extracting foreign matter from seed cotton is also well-known in the art. For Example, the Cotton Ginners' Handbook, published by the Agricultural Research Service, United States Department of Agriculture, issued July 1977, Agricultural Handbook No. 503, obtainable from Superintendent of Documents, U.S. Printing Office, Stock No. 001-000-03678-5 discloses extractors for removing burrs and sticks from seed cotton in which seed cotton is fed to a large diameter saw cylinder by a kicker conveyor. The saw extracts foreign matter from seed cotton by centrifugal force. Additional saw cylinders are used to reclaim the seed cotton extracted with the trash. Trash is directed to augers for discharge.

In the patent to Bledsoe, U.S. Pat. No. 3,988,806, issued on Nov. 2, 1976, for Apparatus For Cleaning Seed Cotton, there is disclosed apparatus for cleaning seed cotton in which there is a primary rotating saw, a doffing brush, a secondary rotating saw and an auger conveyor.

Hesston Farm Equipment has manufactured and sold Hesston 3000 Cotton Harvester, which includes seed cotton cleaners. In the patents to Wagnon, U.S. Pat. No. 2,672,719, issued on Mar. 23, 1954, for Cotton Harvester With Cleaning Means, there is disclosed a cotton harvester with apparatus for separating cotton from the trash. The apparatus includes a cotton boll separator and cotton cleaning apparatus. Likewise, the patent to Wagnon, U.S. Pat. No. 2,707,364, issued on May 3, 1955, for Cotton Harvesting And Cleaning Machine discloses a cotton harvester with a separator and cleaning apparatus. The cotton harvester is mobile. The patent to Wagnon, U.S. Pat. No. 2,869,307, discloses a mobile cotton harvester with apparatus for separating the cotton boll and cleaning the cotton. In addition, a cotton baler is provided for the cotton harvester. The patent to Wagnon, U.S. Pat. No. 2,763,117, issued on Sept. 18, 1956, for Travelling Combination Cotton Shipping, Ginning, Pressing And Other Related Mechanisms, discloses a mobile cotton harvester. The mobile cotton harvester includes apparatus for cleaning the seed cotton and finally subjects the cotton to a pressing operation. Specifically, the machine picks the cotton, subjects the picked cotton to a series of processing operations and finally compresses the cotton.

In the patent to Spell, U.S. Pat. No. 2,625,783, issued on Jan. 20, 1953, for Cotton-Picking Apparatus, there is disclosed a cotton harvester with apparatus for cleaning the cotton or removing foreign material from the picked cotton. The patent to Kent et al., U.S. Pat. No. 3,881,226, issued on May 6, 1975, for Cleaning And Discharge Mechanism For Cotton Harvesters discloses a cotton harvester with apparatus for removing the boll from the seed cotton. Apparatus for extracting trash from the seed cotton is also employed.

The patent to Husky, U.S. Pat. No. 4,031,003, issued June 21, 1977, for Field To Gin Cotton Handling And Storage Systems. The seed cotton is formed into modules by a module builder. After the module is formed, the module is transported on a tilt bed trailer to a gin yard for storage. The apparatus separating bolls and trash from the seed cotton, such as in a pre-ginning process, is connected to the trailer through a conveyor.

SUMMARY OF THE INVENTION

A cotton module builder with extractor apparatus for removing foreign matter from seed cotton.

A cotton module builder in which a door is located at one end thereof. The door is pivotal upwardly to an open position along a horizontal axis at the upper edge of the door for the removal of a cotton module from the frame structure of the module builder. The door is in the closed position while a cotton module is formed in the frame structure. Extractor apparatus for removing foreign matter from seed cotton deposits into the frame structure, cleaned seed cotton to be formed in a module. A hopper and a lifting conveyor are pivotally attached to a cradle supporting the extractor apparatus. The cradle is attached to the cotton module builder. Seed cotton is deposited into the hopper for transfer to the lifting conveyor, which advances the seed cotton to the extractor apparatus. Means raise the lifting conveyor and the hopper out of the path of the door before the door is pivoted to the open position and lower the lifting conveyor and the hopper for receiving seed cotton after the door is pivoted to the closed position.

A module builder comprises a frame structure in which seed cotton is formed into a cotton module. Attached to the frame structure is apparatus for removing foreign matter from seed cotton and for depositing the cleaned seed cotton into the frame structure to be formed into a module.

A feature of the present invention is a conveyor for discharging the trash removed from the seed cotton to either side of the cotton module builder.

Another feature of the present invention is to provide apparatus for forming cotton modules and cleaning the seed cotton before the modules are formed and wherein apparatus for advancing the seed cotton from a hopper to the cleaning apparatus includes a vertical lifting conveyor with transversely disposed members and outwardly projecting cotton lifting members for advancing the seed cotton along a vertical path.

Another feature of the present invention is to provide apparatus for forming cotton modules and cleaning the seed cotton before the modules are formed and wherein apparatus for cleaning and extracting seed cotton is supported by a suspension system to maintain the cleaning and extracting apparatus at a relatively constant height notwithstanding variations in terrain over which the cleaning and extracting apparatus may travel.

DESCRIPTION OF THE DRAWINGS

FIG. 1 is a front perspective view of the module builder of the present invention showing the frame in a raised position with the wheels down and illustrating the apparatus for removing foreign matter from seed cotton;

FIG. 2 is an enlarged section taken on line 2—2 of FIG. 1 illustrating the structure of one of the web beams which brace the sides of the module builder;

FIG. 3 is a partial rear perspective view of the module builder of FIG. 1 showing the apparatus being pulled away to leave a completed cotton module and illustrating the apparatus for removing foreign matter from seed cotton;

FIG. 4 is an enlarged transverse section taken on line 4—4 of FIG. 1 looking rearwardly along the longitudinal axis of the module builder;

FIG. 5 is a fragmentary perspective view of the rear portion of the frame of the module builder illustrating the rear door in its closed (full line) and open (phantom line) conditions and illustrating a portion of a cradle to support the apparatus for removing foreign matter from seed cotton;

FIG. 6 is a fragmentary perspective of a rear interior corner of the frame of the module builder, indicating the connection at one of the side and rear triangular box beams and illustrating a portion of the cradle to support the apparatus for removing foreign matter from seed cotton;

FIG. 7 is an enlarged section taken on line 7—7 of FIG. 6;

FIG. 8 is an enlarged detail view, partially in section, of one of the upper pivotal mountings for the rear door of the module builder as shown in FIG. 5;

FIG. 9 is an isometric view of the compacting apparatus located atop the module builder with the supporting structure therefor being shown in phantom lines;

FIG. 10 is an enlarged view of the chain drive means for the compacting apparatus located at the front corner of the module builder with portions of the cover structure being broken away for the purpose of clarity;

FIG. 11 is a side elevation of one of the wheel suspension means for raising and lowering the module builder;

FIG. 12 is a side elevation of one of the wheel suspension means similar to FIG. 11 but showing the wheels in a "walking" position as when the module builder is transversing an incline;

FIG. 13 is an enlarged fragmentary side elevation view of the rear of the module builder and particularly illustrating the apparatus for removing foreign matter from the seed cotton;

FIG. 14 is an enlarged fragmentary side elevation view of the rear of the module builder and particularly illustrating the apparatus for removing foreign matter from the seed cotton with portions thereof broken away for clarity;

FIG. 15 is a fragmentary horizontal section taken along line 15—15 of FIG. 14 particularly illustrating the apparatus for removing foreign matter from the seed cotton with portions thereof broken away;

FIG. 16 is a fragmentary perspective view of the lifting conveyor of the apparatus for removing foreign matter from the seed cotton with portions thereof broken away;

FIG. 17 is a fragmentary side elevation view of the rear of the module builder and illustrating the apparatus for removing foreign matter from the seed cotton with a suspension assembly for supporting the apparatus;

FIG. 18 is an exploded view of the suspension assembly shown in FIG. 17 for supporting the apparatus for removing foreign matter from the seed cotton.

FIG. 19 is a schematic diagram of a hydraulic system employed in the apparatus for removing foreign matter from seed cotton.

DESCRIPTION OF A PREFERRED EMBODIMENT

Referring to FIG. 1, the module builder 11 of the present invention comprises a generally rectangular open-top frame structure. As shown in FIG. 3, the module builder is arranged to produce a compressed module of cotton 15. FIGS. 1 and 3 show the module builder with its wheels 17 lowered, so that the apparatus may be pulled by a tractor or other vehicle (not shown) attached to a hitch 27 at the front of the builder. The major portion of each side frame comprises a wall 19 which walls slope toward one another at the top, so that the walls are further apart at the bottom of the frame than at the top, as indicated in FIG. 4. The side walls are interconnected at the rearward end of the module builder by a door 36, mounted for upward pivotable movement at its upper edge, and by a closed triangular box beam 44 acting as a header plate (FIG. 6) above the door. The inside surfaces of these opposed walls 19 are preferably smooth so as not to catch and snag the cotton. The walls should be constructed of a material, such as sheet metals, with elastic stiffness sufficient to resist the lateral forces exerted upon the side walls by the tamped cotton.

Each side frame structure also contains solid web beams 23 extending outwardly of and laterally of the side walls and having inner and outer flanges 23a and 23b respectively (FIG. 2) for further lateral strenghening of the side walls. As indicated in FIGS. 2 and 6, the side frame walls 19 are provided by a plurality of separate panels, and two consecutive panels 19a and 19b (FIG. 2) are tied together by a web beam 23 which is welded by its inner flange 23a onto each of the adjacent panels 19a and 19b so as to leave only a small gap 21 (approximately one-half inch) between the continuous edges of the panels. Longitudinal runners 25 (FIGS. 1 and 4) of rectangular box beam cross section are located at the bottom of each of the side frame structures and are welded to the lower edges of the side walls 19 and web beams 23 to further tie the web beams and side walls together, these longitudinal runners make contact with the ground when the wheels 17 are raised (in a manner to be described in greater detail hereinafter).

Attached to the upper portion of each of the side walls 19 is a closed triangular box beam 29 that is comprised of three interconnected walls 29a, 29b and 29c running the length of the module builder. The upper portion of the inner side wall 29c of the triangular box beam 29 is sloped inwardly as shown in FIG. 4 to act, in effect, as a funnel in directing the cotton, deposited from above, into the bin or compacting area of the module builder. The web beam 23 is welded to the underside of the bottom wall 29b of the triangular box beam 29 to further secure the web beam 23, upper triangular box beam 29 and lower side wall 19 together. The presence of the closed triangular beam 29 acts to increase the torsional resistance of the entire side wall structure, and also to stiffen the module builder structure when the door 36 (FIG. 3) is in its opened position, so as to prevent binding of the door.

The torsional resistance of the frame provided by the box beams 29 is proportional to the total enclosed cross sectional area of these beams. The torsional and bending loads are transmitted from side wall beams 29 to end wall beam 44 through the use of an efficient corner design, and cracking or buckling of the structure at the corners of the side wall beams 29 (FIG. 4) is prevented.

Referring to FIG. 5, the rear door of the module builder comprises a vertical panel 37 bounded by and welded to a lateral runner 39 and a torsion tube 43 at the bottom and top, respectively, and welded to spaced vertical braces 41 for additional stiffness and structural integrity. In the preferred embodiment, the tube 43 is a thick-walled cylindrical tube which functions as a pivot for the door and as a torsion tube to support a portion of the door and minimize door "sag" when the door is in the open position. A hydraulic jack 53 includes a piston rod 52 which is attached to a rotatable connection 51 at one of the upper side edges of the door (FIG. 5), the jack being mounted upon a brace 55 attached to the adjacent side wall 19. The jack serves to raise and lower the rear door of the builder for the purpose of depositing the completed module and movement of the builder to another location, as suggested in FIG. 3. Owing to use of the torsion tube 43 which can apply a torsional force to support half of the door, only one such hydraulic jack 53 need be used, rather than one on each side of the door. This results in a simplification of the door opening and closing operations, as it does not require the coordinated operation of two such jacks. In its closed position, the rear door is secured by a leverage bar 48 which is attached to a rod 47 that extends across the width of the door and is provided at its ends with a pair of latches 49. The rod 47 is mounted for rotation, as shown in FIG. 5, and the latches 49 are arranged to engage pins on the adjacent side wall structures.

FIG. 8 is an end view of one of the pivotal mountings 56 for the rear door 36. The pivotal mounting 56, as shown in FIG. 8, comprises a compensating bushing 52 hung in a frame 54 from the underside of the bottom wall 29b of the overlying triangular box beam 29. The bushing 52 rotatably mounts a short shaft 50 which is rigidly secured within the torsion tube 43. The pivotal mounting device for rotatably mounting the other end of the tube 43 is identically constructed.

Above the rear door 36, the rear frame is capped by the delta or closed triangular box beam 44 (FIG. 6) as mentioned hereinbefore. This beam generally serves the same functions as the delta or triangular box beams 29 on the side frame structures. The upper inclined wall 44c of the triangular box beam 44 serves as the upper portion of the interior rear wall, and the rear wall 44a to the box beam 44 serves as a header plate over the door 36. The bottom wall 44b of the box beam 44 lies in a generally horizontal plane.

FIG. 7 is a sectional view near the left rear corner of the module builder, looking rearward along a triangular box beam 29. The bottom wall 29b of the triangular box beam 29 is slightly inclined (approximately 5°) to the horizontal, so that the inner corner of beam 29 rests upon (FIG. 7) and is welded to the bottom wall 44b of the triangular box beam 44 at the rear of the module builder. The weld line at this junction extends inwardly across the width of the bottom wall 44b of beam 44 which, in the preferred embodiment of the invention, is approximately 16–20 inches. The side walls 29a and 44a of the triangular box beams are welded together on their (approximately vertical) line of intersection. The triangular box beams 44 and 29 are thus tied to the remainder of the side frame structure so as to increase torsional resistance of the module builder when the rear door 36 is open.

The tamper mechanism 57, shown schematically in FIGS. 4 and 9, is well-known. The compacting face is provided by a platen 58 formed of two solid bars 59 which are held in parallel alignment and capped at each end by plates 65 and 67. The width of the entire end plates 65 and 67 might be 14 to 18 inches and the width of individual bars 59 is chosen to produce the desired tamping pressure (expressed in pounds per unit area) for the available tamping force. The tamping platen 58 is supported for vertical travel by means of a rectangular frame 71 which is guided by roller bearings within a A-frame structure 61 that is mounted atop the module builder.

The tamping platen 58 is raised and lowered by hydraulic means acting through a vertical rod 60 attached to a piston within a vertically positioned hydraulic cylinder 69 that is mounted for relative sliding movement within the frame 71 (FIG. 9) and that has a length corresponding to the vertical distance of travel (approximately 6 feet) of the platen. The lower end of the cylinder 69 is provided with a housing 70 for inflow and outflow of the hydraulic fluid, and the housing 70 is provided with laterally extending ears 70a (one only shown in FIG. 9) for releasable clamping engagement with structure fixed to the A-frame structure 61 (not shown, and not critical to an understanding of the present invention). The upper end of the cylinder 69 is provided with a vertically extending fitting 72 (FIG. 1) so that the hydraulic line connection will not be forced into the frame 71 when the platen is raised to its full elevated position (FIG. 4). However, when the module builder is being transported on the road, the ears 70a of the cylinder 69 may be released from engagement with the A-frame 61 and the cylinder lowered with the platen within the side walls 19 to allow the builder to pass under overpasses and other low-lying obstructions.

The supporting A-frame structure 61 is provided with four wheels 62 which move longitudinally along two rails 63 (two wheels on each rail) mounted at the top outer edge of the side box beams 29 of the frame structure (FIG. 4). The wheels 62 may have an outer level 64 as shown in FIG. 4, of increased radius to encourage the wheels to stay on the rails. The wheels themselves may be metal, as is conventional, or they may be solid rubber to reduce vibration and noise when the tamping mechanism is in use or when the module builder is being transported.

An endless chain 75 is attached to brackets 73 (FIGS. 1 and 4) at each side of the A-frame structure 61. Each chain 75 has an upper run (to which the A-frame is attached) for moving the tamping mechanism longitudinally along the open top of the module builder and a lower run carried by a fixed tract 76 (shown in FIG. 10). Each chain is powered by a reversible motor 78 (FIG. 19) positioned behind a control panel 109 (FIG. 1) at the forward end of the module builder. The drive motor 78 provides power for a drive sprocket 77 (FIG. 10) at the front end of each chain 75 by means of a laterally extending drive shaft 79. As the drive shaft 79 rotates, the sprockets 77 are turned to drive the chains 75 and move the tamping mechanism 57 forward or backward along the rails 63. The wheels 62 which support the tamping mechanism are prevented from continuing beyond the ends of the rails 63 by bumpers 80 mounted at each end of each rail (FIG. 1). At the rear end of the module builder, each chain 75 is mounted by means of an idler sprocket 74 (FIG. 7).

FIGS. 11 and 12 illustrate the means for and the method of raising and lowering each set of wheels 17, such means comprising a walking suspension beam. A hydraulic jack 81 is provided at each side of the module builder and is attached to the adjacent frame side wall 19 at its upper end. Each jack includes a downwardly extending piston rod 85 which is rotatably attached by a clevis 87 at its distal end to the central portion of a generally horizontal beam 89. This beam 89 is, in turn, rotatably connected at its two ends by pins 91 to two parallel blocks 93, each of which is constrained for vertical sliding movement only by a pair of parallel tracks 99 which are hung from a horizontal bar 86 suspended between the two consecutive web beams 23 at the longitudinal center of the side frame structure. The blocks 93 are constrained to move vertically in the sets of tracks 99 so as to allow the two wheels 17 on either side to move vertically relative to the frame structure with the wheels being rotatably mounted by stub shafts 95 at the lower end of the blocks. By raising or lowering the piston rod 85 within the hydraulic jack 81, the wheels are raised or lowered a corresponding amount.

As shown in FIGS. 11 and 12, one of the connections of each of the beams 89 with a vertically oriented block 93 comprises an elongated slot 92 which allows the connecting pin 91 to slide during relative pivotal movement between beam 89 and block 93 so as to prevent binding. Freed from their horizontal constraint, the wheels 17 of each set move vertically relative to one another (as shown in FIG. 12) so as to permit the module builder to traverse hilly or rough terrain.

The vertical orientation of the piston rod 85 is fixed relative to the frame of the module builder, so that each wheel unit effectively pivots about the connecting pins in the clevis 87 at the end of the piston rod. The wheel units on each side of the module builder move independently of one another as the units are independently suspended. Referring to FIG. 4, it will be seen that the longitudinal center line of each hydraulic jack 81 generally coincides with the vertical plane 18 through the center of each of the connected wheels 17. This arrangement minimizes bending stresses in the side wall frame structures by transmitting the vertical force of the module builder weight from the hydraulic jacks 81 directly through the wheels 17 to the ground.

The side frame structure directly over the wheels 17 is specially reinforced with gussets 100 (FIG. 4), each of which serve to mount the upper end of the underlying hydraulic jack 81 by means of an anchor plate 83 which is rotatably secured to the end of the jack. Each gusset will be seen to comprise a vertically extending outer wall 100a, a laterally extending short wall 100b, and an inclined wall 100c with the anchor plate 83 being welded to the underside of the lower wall 100b. the upper edges of gusset walls 100a and 100c are welded to the lower wall 29b of the overlying triangular box beam 29. The gussets 100 span the distance between the web beam 23 at the center of the side frame structures. A reinforcing plate 98 (FIG. 4) is enclosed within the walls of each of the gussets in the plane of the associated jack 81 to strengthen the gusset at its point of highest stress. Additionally, two separate and spaced plates 96 are enclosed within and welded to the interior walls of the triangular box beams 29 forming the upper side wall structures of the module builder. The plates 96 are vertically oriented and are located just above the two web beams at the center of each side of the side wall structure in order to strengthen the frame structure at these high stress points. Additional reinforcing plates 96 may be enclosed within the box beams 29 at other points along the length of the module builder where extra strenghening is desirable.

The upper portion of the front end of the module builder is also provided with a delta or closed triangular box beam 102 (FIG. 1) which is structurally similar to the rear box beam 44 and is rigidly connected to the side box beams 29 in the same manner the beam 44 is jointed to the side box beams 29. The outer wall 102a of the box beam 102 mounts the control panel 109 for the module builder as shown in FIG. 1. The major portion of the front wall is formed by a panel 104 which is hung from and supported by the overlying beam 102.

As shown in FIG. 1, the front end of the module builder includes a superstructure which allows the operator to control the operation of the module builder through the control panel 109. The operator may mount either of a pair of ladders 103 to reach a raised platform 105 upon which is provided a chair 107 for the convenience of the operator in manipulating the module builder controls. From the platform 105, the operator is afforded a view of the entire bin into which the cotton is deposited for compression into a module. From the control panel 109, the operator can control the operation of the tamping mechanism 57, the door raising cylinder 53 at the rear of the module builder, the hydraulic jacks 81 for operation of the wheel suspension means, and the reversible motor 78 which controls the longitudinal movement of the tamping mechanism. It is also contemplated through a switching arrangement which is manually controlled that the extracting apparatus hereinafter described can also be controlled at the control panel 109. A connection 106 to the tractor drive shaft may provide the power for the various hydraulic mechanisms and for the reversible motor 78. The source of hydraulic power is described in detail hereinafter.

For cleaning seed cotton before it is deposited into the opened-top rectangular frame structure, cleaning or extractor apparatus 125, a lifting conveyor 130 and a hopper 135 are supported by the frame structure of the cotton module builder 11 (FIGS. 1 and 3). More specifically, a cradle 140 is fixedly secured to the delta beam 44 of the frame structure of the cotton module builder 11 along the rear wall thereof (FIGS. 13 and 14). The cradle 140 is secured to the frame structure of the cotton module builder 11 through a transversely spaced, longitudinally extending beams 141 and 142 that are bolted to the delta beam 44 of the frame structure of the cotton module builder 11 and a horizontally disposed beam 143 that is welded to the distal ends of the beams 141 and 142.

The cradle 140 forms a support bed for the extractor apparatus 125 through diagonal beams 145 and 146, the horizontal beams 147 and 148 and the upright beams 149 and 150. The lifting conveyor 130 and the hopper 135 are supported for pivotal movement by the upright plates 149 and 150 of the cradle 140 about a drive shaft 163 (FIG. 14), which is supported for rotation by suitable bearings 151 (FIG. 13).

Initially, seed cotton is deposited into the hopper 135 (FIG. 1) from a cotton stripper, not shown. Such seed cotton contains trash, such as green bolls, sticks and the like. The hopper or basket 135 (FIGS. 1,3 and 5) comprises an open-top frame 152 having confronting side plates 153 and 154. The side plates 153 and 154 of the hopper 135 are bolted to the longitudinal plates 155 and 156, respectively, of the lifting conveyor 130 for pivotal movement with the lifting conveyor 130. The confronting side plates 153 and 154 of the hopper 135 are directed outwardly and rearwardly from the lifting conveyor 130. Projecting forwardly and rearwardly from the confronting side plates 153 and 154 are frames 155' and 156' with wire mesh side walls. A bottom wall 157 is preferably made of sheet metal. The bottom wall 157 is inclined upwardly and rearwardly for gravity feeding seed cotton toward the lifting conveyor 130. A rear wall 158 with wire mesh includes a rear frame 159 that is sloped inwardly and forwardly to continuously feed seed cotton toward the lifting conveyor 130.

There is no front wall for the hopper 135 so that lifting conveyor 130 is constantly exposed to the seed cotton contained in the hopper 135. For lifting seed cotton from the hopper 135 to the cleaning or extractor apparatus 125, the lifting conveyor 130 (FIGS. 13 and 14) extends from the extractor apparatus 125 below the bottom wall 157 of the hopper 135. Supported by the longitudinal beams 155 and 156, respectively, are lower sprockets 160. Similarly, supported by the longitudinal beams 155 and 156 are upper sprockets 162. Trained around vertically aligned sprockets 160 and 162, respectively, are roller conveyor belts 165. In the preferred embodiment, carried by successive rollers of the roller conveyor belt 165 through chain links are transversely disposed members 170. In the exemplary embodiment, the members 170 are in the form of slats, such as Oak boards. More specifically, each member 170 is secured to the successive rollers 165a and 165b of the roller conveyor belt 165 by a well-known chain link. A member 170 is secured to the adjacent successive rollers 165a and 165b through the well-known chain link. This arrangement is continuous along the entire conveyor belt 165.

More specifically, the upper sprockets 162 are the drive sprockets and the lower sprockets 160 are the driven or idler sprockets. In the exemplary embodiment, there are five upper sprockets and five lower sprockets. The upper sprockets 162 are driven by the drive shaft 163 and the lower sprockets 160 are rotatably about a shaft 160'. The members 170 are secured by nuts and bolts to their associated links and rollers of the roller conveyor belts 165. The members 170 are secured to the associated links of the roller conveyor belts 165 so that there is a continuous loop of members 170 about the roller conveyor belts 165. Projecting outwardly and upwardly from the members 170, respectively, are transversely aligned seed cotton lifting members 171. In the exemplary embodiment, the members 171 are in the form of spikes or nails (FIG. 16). The roller conveyor belts 165 advances upwardly at the rearwardly facing run thereof in the counterclockwise direction as viewed in FIG. 14, which is in the direction of an arrow 172 as shown in FIG. 14.

As the roller conveyors 165 advance in the direction of the arrow 172 (FIG. 14), the seed cotton lifting members 171 advance seed cotton from the hopper 135 with the upwardly movement of the rearward runs of the conveyor belts 165. The movement of the seed cotton onto the conveyor belts 165 by the lifting members 171 causes a tumbling action at the bottom of the hopper 135 to provide an initial cleaning of the seed cotton.

A suitable hydraulic motor 173, connected to a suitable source of fluid under pressure from a hydraulic power source 174 of the cotton module builder 11 through flexible hoses drives the shaft 163 to which the upper sprockets 162 are secured. The hydraulic motor 173 is controlled at a control panel 175 located at the rear of the frame structure. The source of power 174 is a three stage hydraulic pump. Fluid for the source of power 174 is stored in tanks 174A and 174B.

The shaft 163 is a rotatable within the bearings 151. The upright members 155 and 156 of the lifting conveyor 130 pivot about the drive shaft 163.

When the door 36 of the module builder 11 is in the opened, raised position (FIG. 3), the lifting conveyor 130 and the hopper 135 are also raised to be lifted out of the path of movement of the door 36 and out of the path of the movement of the compressed cotton module 15. When the door 36 of the module builder 11 is in the closed, lowered position, the lifting conveyor 130 and the hopper 135 are also in the lowered position for the deposit of cleaned seed cotton into the open-top frame of the module builder 11 to be compressed into a cotton module (FIG. 1). The door 36 is closed during the forming of a cotton module from seed cotton.

For pivoting the lifting conveyor 130 and the hopper 135 relative to the cradle 140, a hydraulic jack 180 (FIG. 13) interconnects the beams 141' with the longitudinal plate 156 of the lifting conveyor 130 and a hydraulic jack 181 (FIG. 1) interconnects the beam 156" with the longitudinal plate 155 of the lifting conveyor 130. The beams 141' and 156" are welded to longitudinal runners 25 at the bottom thereof and to beams 29 at the top thereof and are also welded to the frame structure therebetween. The hydraulic jacks 180 and 181 include an ear at the lower end of the hydraulic cylinder thereof for pivotal connection to the struts 141' and 156", respectively and a clevis at the free end of the piston thereof for pivotal connection to the longitudinal plates 155 and 156, respectively, of the lifting conveyor 130. Fluid under pressure is supplied through conduits from the hydraulic power source 174 of the cotton module builder 11 for operating the hydraulic jacks 180 and 181 in unison. The operation of the hydraulic jacks 180 and 181 is controlled at the control panel 109.

The lifting conveyor 130 advances seed cotton to the extractor or cleaning apparatus 125 for removing from the seed cotton green bolls, sticks and the like. Toward this end, the extractor or cleaning apparatus (FIG. 14) comprises a conventional conveyor doffer 185. The conveyor doffer 185 removes the seed cotton from the upper most run of the lifting conveyor 130 and feeds the seed cotton onto a conventional main saw or extracting cylinder 190 of the extractor apparatus 125. The seed cotton adheres to the teeth of the main saw 190. Pipes 191 and stationary brushes 192 ensure that the seed cotton stays on the main saw 190. Centrifugal force causes the trash to fall from the blades of the main saw 190.

Below the main saw 190 is a conventional reclaimer saw 195 and below the reclaimer saw 195 is an auger trash conveyor or screw trash conveyor 200 (FIGS. 14 and 15). The trash that falls from the main saw 190 falls onto the screw trash conveyor 200 to be discharged from either side of the extractor apparatus 125. Should seed cotton falls from the main saw 190, it will fall onto the reclaimer saw 195. Trash from the reclaimer saw 195 falls onto the screw conveyor 200 and seed cotton adheres to the teeth of the reclaimer saw 195. Pipes 196 and stationary brushes 197 ensure that the seed cotton adheres to the teeth of the reclaimer saw 195.

A conventional doffing brush 205' removes seed cotton from the main saw 190 and the reclaimer saw 195 for discharge through a chute 210 into the open-top frame of the cotton module builder 11.

the doffer conveyor 185 rotates in the clockwise direction as viewed in FIG. 14. Similarly, the main saw 190 and the reclaimer saw 195 are supported for rotation in the clockwise direction as viewed in FIG. 14. The doffer brush 205' is supported for rotation in the counterclockwise direction as viewed in FIG. 14. A hydraulic motor 201 (FIG. 13) drives the main saw 190. A pulley, not shown, is fixed to the shaft of the main saw 190 for rotation therewith. A belt and pulley arrangement, now shown, which includes an idler roller and a belt tensioner idler roller is driven by the hydraulic motor 201 through the pulley fixed to the shaft of the main saw 190 and rotates the drive shaft of the reclaimer saw 195 and to the drive shaft of the doffer brush 205' for imparting rotation thereto. The main saw 190 rotates at a preferred rate of 350 R.P.M., the reclaimer saw 195 rotates at a preferred rate of 290 R.P.M., and the doffer brush 205' rotates at a preferred rate of 900 R.P.M.

A hydraulic drive motor 202 operates the doffer conveyor 185. A hydraulic drive motor 205 operates the screw conveyor 200. The hydraulic drive motors 201 and 205 are controlled by a solenoid operated valve 206. The hydraulic drive motors 173 and 202 are controlled by a solenoid operated valve 207. The hydraulic drive motor 173 operates the endless conveyor 130. When the operator turns on the extractor apparatus 125, the solenoid operated valves 206 and 207 are opened to operate the motors 201, 205, 202 and 173 at a constant speed. The output volume of the seed cotton discharged from the chute 210 is determined by the input volume of the seed cotton into the extractor apparatus 125 is determined by the speed of the lifting conveyor 130. The solenoid operated valves 206 and 207 are located at the left rear of the frame structure with electric toggle switches having on-off-on positions located at the control panel 109 and at the control panel 175.

The screw conveyor 200 is driven by the hydraulic motor 205 through a chain belt 211 and a sprocket 212 (FIGS. 14 and 15). A sprocket is fixed to the shaft of the drive motor 205 and has the chain belt 211 trained therearound. The chain belt 211 is also trained around the sprocket 212 for imparting rotation thereto. Augers 215 of the screw conveyor 200 are divided into right hand augers 215a and left hand augers 215b (FIG. 15). One half of the augers 215 on one side of the transverse center line of a screw conveyor drive shaft 216 are right hand augers 215a and on the opposite side of the transverse center line of the screw conveyor drive shaft 216 are left hand augers 215b. In this manner, trash is advanced to be discharged from both sides of the extractor apparatus 125. The screw conveyor 200 is disposed within a trough 220 of a housing 225. The sprocket 212 is fixed to the drive shaft 216 for imparting rotation thereto.

The hydraulic power for operating the various hydraulic motors of the extractor apparatus 125, the lifting conveyor 130 and the hydraulic lifts 180 and 181 is derived from the power source 174 of the cotton module builder 11. The various hydraulic motors for the extractor apparatus 125 are controlled at the control panel 175 or in the alternative at the front panel 109.

For maintaining the cleaning and extracting apparatus 125, the hopper 135 and the lifting conveyor 130 at a relatively constant height regardless of the terrain over which they may travel, the apparatus of the present invention is modified to the extent that it is provided with a suspension assembly 226 to support the cradle in lieu of fixedly securing the cradle to the beam 44 of the frame structure of the cotton module builder 11 as previously described for the cradle 140. The suspension assembly 226 (FIGS. 17 and 18) comprises transversely spaced upright posts 230 and 235. The upright posts 230 and 235 are spaced apart transversely a sufficient distance so as not to interfere with the opening and closing of the door 36 of the frame structure of the module builder 11 and so as not to interfere with the advancement of a cotton module 15 from the frame structure of the module builder 11.

At the lowermost extremities of the posts 230 and 235 are preferably dual wheel casters 236 and 237, respectively. The posts 230 and 235 include removable sections 238 and 239, respectively, to regulate the height thereof. When the cotton module builder is a stripper builder, the sections 238 and 239 are employed. When the cotton module builder is a picker builder, the sections 238 and 239 are moved. A stripper builder generally is two feet taller than a picker builder.

Projecting upwardly and rearwardly from the posts 230 and 231 are diagonal struts 240 and 241, respectively. Interconnecting the posts 230 and 231 with the upper ends of struts 240 and 241, respectively, are horizontal members 242 and 243. Joining the horizontal members 242 and 243 are upright members 244 and 245, respectively. Horizontal members 246 and 247 extend between the posts 230 and 231 and the upper end of the upright members 244 and 245. Extending inwardly from the posts are aligned horizontal members 247 and 248.

Extending upwardly and forwardly from the horizontal members 247 and 248, respectively, are diagonal members 250 and 251. Joining the uppermost ends of the posts 230 and 235 is a transverse member 252. Depending from the transverse member 252 are ears 253, which receive a pin 254. The pin 254 is fixed to ears 253 by welding.

Bushings 256 are fixed on each side of a transverse member 257 of the cradle 255. The bushings 256 enable the pin 254 to rotate therein to allow the transverse members 252 and the joining structure to freely pivot as the terrain on which the casters 236 and 237 move varies in elevation with respect to each other. Depending from the ends of the transverse member 257 are upright members 258 and 259. At the upper ends of the upright members 258 and 259 are ears 261 and 262. The drive shaft 163 for the lifting conveyor 130 is journalled for rotation by the ears 261 and 262, and the longitudinal members 155 and 156 of the lifting conveyor 130 are pivotal about the drive shaft 163 in a manner previously described.

Thus, the casters 236 and 237 follow the contour of the terrain. The posts 230 and 235 and the transverse member 252 are raised and lowered with the up and down movement of the casters 236 and 237. The raising and lowering of the posts 230 and 235 and the transverse members 252 raise and lower the cradle 255, the lifting conveyor, the hopper 135 and the extractor or cleaning apparatus 125. The extractor or cleaning apparatus 125 is supported by the cradle 255 in a manner previously described for the support of the extractor apparatus 125 by the cradle 140. While the cradle 255 moves up and down with the raising and lowering of the casters 236 and 237, the posts 230 and 235 and the transverse member 252 are able to pivot in a transverse plane about the axis of the pin 254 relative to the cradle 255 in the event the casters 236 and 237 are at different elevations.

The cradle 255 includes horizontal members 265 and 266 that project forwardly in the longitudinal direction. Projecting forwardly and upwardly from the horizontal members 265 and 266 are diagonal members 267 and 268, respectively. The forward ends of the diagonal members 267 and 268 are fixedly secured to a transverse member 270. The diagonal members 250 and 251, which have been previously described, are fixedly secured to the ends of a transverse member 271. Intermediate the ends of the transverse member 271 are fixed aligned upright ears 272 and 272'. The ear or bushing 272 fixed to the transverse member 271 receives a pin 271 for free pivotal movement thereabout. In turn, the pin 273 is fixedly secured to the transverse member 270 through the ear 272'. Thus, the posts 230 and 235 and the horizontal member 252 are pivotal in a transverse plane relative to the transverse member 270 and the transverse member 270 is raised and lowered with the raising and lowering of the casters 236 and 237. Stated otherwise, the raising and lowering of the casters 236 and 237 travelling along uneven terrain serves to raise and lower the transverse member 270, and the casters 236 and 237 travelling over terrain at different elevations enables the transverse member 252 to pivot in a transverse plane relative to the transverse member 270.

Depending from the transverse member 270 at the opposite ends thereof are upright members 275 and 276. Parallel longitudinal members 280 and 281 pivotally interconnect the upright member 275 with the beam 141'. In a similar manner, parallel longitudinal members 282 and 283 pivotally interconnect the upright member 276 with the beam 156". Through this arrangement, a parallelogram support is formed by the beam 141', the parallel members 280 and 281, and the upright member 275 for one side of the cradle 255 and a parallelogram support is formed for the other side of the cradle 255 by the beam 156", the parallel members 282 and 283, and the upright member 276. Thus, the upright members 275 and 276 and the transverse member 270 can be raised and lowered in a vertical plane, but do not have any pivotal movement in a transverse plane.

Hence, the suspension assembly 226 supports the cradle 255 from the frame structure of the cotton module builder 11 to provide an up and down movement thereof as the casters 236 and 237 travel over uneven terrain, but does not permit a side-to-side pivotal movement of the cradle 255 as the casters 235 and 237 travel over terrain of unequal elevation. Thus, the lifting conveyor 130, the hopper 135 and the extractor apparatus 125 will be raised and lowered as the casters 236 and 237 travel over uneven terrain, but will not be pivoted from side-to-side as the casters 236 and 237 travel over terrain of unequal elevation.

In FIG. 19, there is illustrated the hydraulic jack 53 for raising and lowering the rear door 37. The operation of the hydraulic jack 53 is controlled by a solenoid operated control valve 300. The solenoid operated valve 300 is operatively controlled by an electric toggle switch having on-off-on positions located at the control panel 109 and the control panel 175. An adjustable pressure compensated flow valve 301 controls the speed of the opening and closing movement of the rear door 37. Communicating with the control valve 300, the hydraulic jack 53 and the hydraulic jacks 180 and 181 for the lifting conveyor 130 is a sequence pressure relief valve 302. The sequence valve 302 ensures the lifting conveyor 130 is raised to the full height before the hydraulic jack 53 raises the rear door 37. A manually operated control valve, not shown, controls the operations of the hydraulic jacks 81 to raise and lower the frame structure relative to the ground.

A manually operated control valve 305 controls the operation of the cylinder 69 for the tamping machine 57.

The carriage drive for the tamping mechanism 57 to impart longitudinal movement thereto is controlled by a manually operated control valve 306, which controls the operation of the reversible motor 78. A power source, such as a gasoline engine, diesel engine, or an electric motor drives the hydraulic pumps 174 through the shaft 106. The hydraulic pumps 174 provide fluid under pressure through suitable hydraulic hoses for the operation of the various hydraulic devices and apparatus employed in the module builder 11.

Communicating with the cylinders of the hydraulic jacks 81 for raising and lowering the frame structure are fluid dividers, not shown, which are arranged for the hydraulic jacks 81 to operate simultaneously in response to the operation of the manually controlled valve, not shown. Conventional pressure relief valves 310-312 communicate with the tamper carriage drive fluid motor 98 for the tamping mechanism 57. Interconnecting the tamper cylinder 69 and the manually operated control valve 305 is a counterbalance valve 315, which serves to apply a back fluid pressure to the tamper cylinder 69 to prevent the lowering of the compacting platen 58 when there is an absence of cotton in the frame structure to be compacted. Also, it prevents the platen 58 from being lowered too rapidly. In order for the platen 58 to be lowered, a back fluid pressure of 400 p.s.i. must be present. Thus, the cylinder 87 must sense a back fluid pressure of 400 p.s.i. for the platen 58 to be lowered.

Communicating with the cylinder 69 and the manually operated control valve 305 is an excess flow valve 316 which provides a path for the flow of excess fluid between the control valve 305 and the cylinder 69. Communicating with the fluid motor 173 for the lifting conveyor 130 and the fluid motor 202 for the extractor doffer conveyor 185 and the solenoid operated valve 207 are adjustable flow dividers 318 and 319. The adjustable flow divider 318 controls the speed of operation of the lifting conveyor 130 and the adjustable flow divider 319 controls the speed of operation of the doffer conveyor 185.

In a similar manner, needle valves 320 and 321 communicate with the fluid motor 201 for the extractor saw 190 and the fluid motor 205 for the auger conveyor 200 and the solenoid operated valve 206. The needle valve 320 controls the speed of operation of the extractor saw 190 and the needle valve 321 controls the speed of operation of the auger conveyor 200. A pressure relief valve 326 communicates with the pump 174 and the solenoid operated valve 206. A pressure relief valve 326 communicates with the pump 174 and the solenoid operated valve 207. An adjustable pressure compensated flow valve 330 communicates with the solenoid operated control valve 300 and the hydraulic jacks 180 and 181 for the lifting conveyor 130 to control the speed at which the lifting conveyor 130 is lowered by the hydraulic jacks 180 and 181.

We claim:

1. In seed cotton processing equipment, a lifting conveyor comprising:
 (a) an upper sprocket;
 (b) a lower sprocket disposed below said upper sprocket in a generally vertical plane;
 (c) endless conveyor means trained around said upper sprocket and said lower sprocket to be advanced thereby;
 (d) means for advancing said endless conveyor means by at least one of said sprockets;

(e) a plurality of transversely extending members mounted in succession on said endless conveyor means for movement therewith; and (h) a plurality of outwardly directed lifting members projecting from each of said transverse members for lifting seed cotton to be carried by said lifting conveyor; and (i) a hopper in which seed cotton is deposited, said hopper including angularly disposed walls directing the seed cotton deposited therein toward said lifting conveyor.

2. In seed cotton processing equipment as claimed in claim 1 wherein said endless conveyor means of said lifting conveyor comprises a plurality of transversely spaced endless chains to which said transversely extending members are mounted in succession.

3. In seed cotton processing equipment as claimed in claim 2 wherein said endless chains are in the form of rollers, each of said transversely extending members being respectively mounted on successive rollers of each of said chains and on transversely aligned rollers of said chains.

4. In seed cotton processing equipment as claimed in claim 3 wherein said lifting members on the runs of said endless chains advancing from said lower sprocket toward said upper sprocket are upwardly directed.

5. Apparatus for forming cotton modules comprising:
(a) a frame in which seed cotton is deposited;
(b) a tamping mechanism on said frame for compressing seed cotton in said frame to form a cotton module, said tamping mechanism having a horizontal reciprocating movement and a vertical reciprocating movement;
(c) trash extracting means connected to said frame for extracting trash from said seed cotton before the seed cotton is deposited into said frame to be compressed into a cotton module;
(d) support means connected to said frame, said trash extracting means being supported by said support means;
(e) a hopper in which seed cotton is deposited, said hopper being supported by said support means; and
(f) a lifting conveyor supported by said support means adjacent said hopper and said trash extracting means for advancing seed cotton from said hopper to said trash extracting means,
said trash extracting means comprising:
  (a) extracting means for separating trash from seed cotton,
  (b) doffer means for advancing seed cotton from said lifting conveyor toward said extracting means,
  (c) discharge means overlying said frame,
  (d) doffer means for advancing seed cotton from said extracting means to said discharge means for depositing seed cotton into said frame, and
  (e) trash conveyor means disposed below said extracting means for discharging trash removed from seed cotton from said extracting means.

6. Apparatus for forming cotton modules comprising:
(a) a frame in which seed cotton is deposited;
(b) a tamping mechanism on said frame for compressing seed cotton in said frame to form a cotton module, said tamping mechanism having a horizontal reciprocating movement and a vertical reciprocating movement;
(c) trash extracting means connected to said frame for extracting trash from said seed cotton before the seed cotton is deposited into said frame to be compressed into a cotton module;
(d) support means connected to said frame, said trash extracting means being supported by said support means;
(e) a hopper in which seed cotton is deposited, said hopper being supported by said support means;
(f) a lifting conveyor supported by said support means adjacent said hopper and said extracting means for advancing seed cotton from said hopper to said extracting means; and
(g) said frame being an open-top frame and including a door at one end thereof supported for pivotal movement along a horizontal axis at the upper section of said frame, said door being closed when said tamping mechanism compresses seed cotton to form a cotton module and said door being opened when the cotton module advances fom said open-top frame, said lifting conveyor and said hopper being arranged for pivotal movement relative to said support means about an axis parallel to the horizontal axis about which said door pivots,
(h) means arranged to pivot said lifting conveyor and said hopper about said parallel axis out of the path of said door when said door is opened and to return said lifting conveyor and said hopper to the initial position when said door is closed.

7. Apparatus as claimed in claim 6 wherein said lifting conveyor is disposed in a generally upright position between said frame and said hopper.

8. Apparatus as claimed in claim 7 wherein said hopper includes angularly disposed walls directing the seed cotton deposited therein toward said generally upright lifting conveyor.

9. Apparatus as claimed in claim 7 wherein said extracting means comprises:
(a) extracting means for separating trash from cotton seed;
(b) doffer means for advancing seed cotton from said lifting conveyor toward said extracting means;
(c) discharge means overlying said frame;
(d) doffer means for advancing seed cotton from said extracting means to said discharge means for depositing seed cotton into said frame; and
(e) trash conveyor means disposed below said extracting means for discharging trash removal from seed cotton from said extracting means.

10. Apparatus as claimed in claim 9 wherein said lifting conveyor comprises:
(a) an upper sprocket;
(b) a lower sprocket;
(c) endless conveyor means trained around said upper sprocket and said lower sprocket to be advanced thereby;
(d) means for driving said endless conveyor means by at least one of said sprockets;
(e) a plurality of transversely extending members mounted in succession on said endless conveyor means for movement therewith; and
(f) outwardly directed lifting members projecting from said transverse members for lifting seed cotton to be carried by said lifting conveyor.

11. Apparatus as claimed in claim 10 wherein said endless conveyor means of said lifting conveyor comprises a plurality of transversely spaced endless chains to which said transversely extending members are mounted in succession.

12. Apparatus as claimed in claim 11 wherein said endless chains are in the form of rollers, each of said transversely extending members being respectively mounted on successive rollers of each of said chains and on transversely aligned rollers of adjacent chains.

13. Apparatus as claimed in claim 10 wherein said lifting members on the runs of said endless chains advancing from the lower sprocket toward the upper sprocket are upwardly directed.

14. Apparatus as claimed in claim 9 wherein said trash conveyor comprises:
 (a) a shaft;
 (b) means for rotating said shaft;
 (c) a plurality of right hand auger blades secured to one section of said shaft for rotation therewith for discharging trash from one end of said trash conveyor; and
 (d) a plurality of left hand augers blades secured to an opposite section of said shaft for rotation therewith for discharging trash from an opposite end of said trash conveyor.

15. Apparatus as claimed in claim 5 wherein said trash conveyor comprises:
 (a) a shaft;
 (b) means for rotating said shaft;
 (c) a plurality of right hand auger blades secured to one section of said shaft for rotation therewith for discharging trash from one end of said trash conveyor; and
 (d) a plurality of left hand auger blades secured to an opposite section of said shaft for rotation therewith for discharging trash from an opposite end of said trash conveyor.

16. Apparatus for forming cotton modules comprising:
 (a) a frame in which seed cotton is deposited;
 (b) a tamping mechanism on said frame for compressing seed cotton in said frame to form a cotton module, said tamping mechanism having a horizontal reciprocating movement and a vertical reciprocating movement;
 (c) trash extracting means connected to said frame for extracting trash from said seed cotton before the seed cotton is deposited into said frame to be compressed into a cotton module;
 (d) support means connected to said frame, said trash extracting means being supported by said support means; and
 (e) a suspension assembly for said support means, said suspension assembly comprising:
  (a) a plurality of posts;
  (b) ground engaging means at the bottom of each of said posts;
  (c) first linkage pivotal in a vertical plane and interconnecting each side of said frame with said support means for preventing side-by-side pivotal movement of said support means, said first linkage being movable for raising and lowering with said support means; and
  (d) second linkage pivotal in a transverse plane and interconnecting said posts with said support means and said first linkage for raising and lowering said support means and said first linkage in accordance with variations in terrain over which said ground engaging means travel, said second linkage and said posts being freely pivotal in a transverse plane relative to said support means and said first linkage.

17. Apparatus as claimed in claim 16 wherein said first linkage and said second linkage including said posts extend rearwardly from the associated sides of said frame respectively substantially in alignment therewith.

18. Apparatus as claimed in claim 17 wherein each of said first linkage comprises parallel members pivotally connected to its associated side of said frame and extending therefrom rearwardly substantially in alignment therewith, and a generally upright member interconnected pivotally to its associated parallel members and said support means.

19. Apparatus as claimed in claim 16 wherein said suspension assembly further comprises pivot means interconnecting said support means and said second linkage, said second linkage being freely pivotal about said pivot means, whereby said second linkage pivots freely in a transverse plane while raising and lowering said support means as said ground engaging means travel over uneven terrain.

20. Apparatus as claimed in claim 6 and comprising a suspension assembly for said support means, said suspension assembly comprising:
 (a) a plurality of posts;
 (b) ground engaging means at the bottom of each of said posts;
 (c) first linkage pivotal in a vertical plane and interconnecting each side of said frame with said support means for preventing side-by-side pivotal movement of said support means, said first linkage being movable for raising and lowering with said support means; and
 (d) second linkage pivotal in a transverse plane and interconnecting said posts with said support means and said first linkage for raising and lowering said support means and said first linkage means in accordance with variations in terrain over which said ground engaging means travel, said second linkage and said posts being freely pivotal in a transverse plane relative to said support means and said first linkage.

21. Apparatus as claimed in claim 20 wherein said first linkage and second linkage including said posts extend rearwardly from the associated sides of said frame respectively substantially in alignment therewith.

22. Apparatus as claimed in claim 21 wherein each of said first linkage includes parallel members pivotally connected to its associated side of said frame and extending therefrom rearwardly substantially in alignment therewith, and a generally upright member interconnected pivotally to its associated parallel members and said support means.

23. Apparatus as claimed in claim 22 wherein said suspension assembly further comprises pivot means interconnecting said support means and said second linkage, said second linkage being freely pivotal about said pivot means, whereby said second linkage pivots freely in a transverse plane while raising and lowering said support means as said ground engaging means travels over uneven terrain.

24. A lifting conveyor comprising:
 (a) an upper sprocket;
 (b) a lower sprocket;
 (c) endless conveyor means trained around said upper sprocket and said lower sprocket to be advanced thereby;

(d) means for advancing said endless conveyor means by at least one of said sprockets;

(e) a plurality of transversely extending members mounted in succession on said endless means for movement therewith; and (f) a plurality of outwardly directed lifting members projecting from each of said transverse members for lifting articles to be carried by said lifting conveyor.

25. A lifting conveyor as claimed in claim 24 wherein said endless conveyor means of said lifting conveyor comprises a plurality of transversely spaced endless chains to which said transversely extending members are mounted in succession.

26. A lifting conveyor as claimed in claim 25 wherein said endless chains are in the form of rollers, each of said transversely extending members being respectively mounted on successive rollers of each of said chains and on transversely aligned rollers of said chains.

27. A lifting conveyor as claimed in claim 24 wherein said lifting members on the runs of said endless chains advancing from the lower sprocket toward the upper sprocket are upwardly directed.

* * * * *